Dec. 16, 1924.
R. C. FRANKE
1,519,198
COTTON CHOPPER
Original Filed June 30, 1922    2 Sheets-Sheet 1
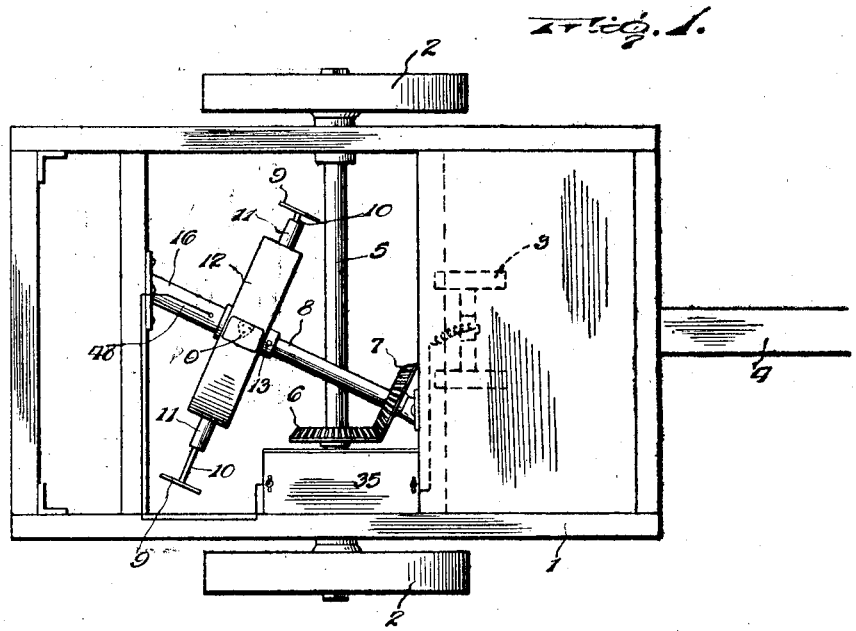
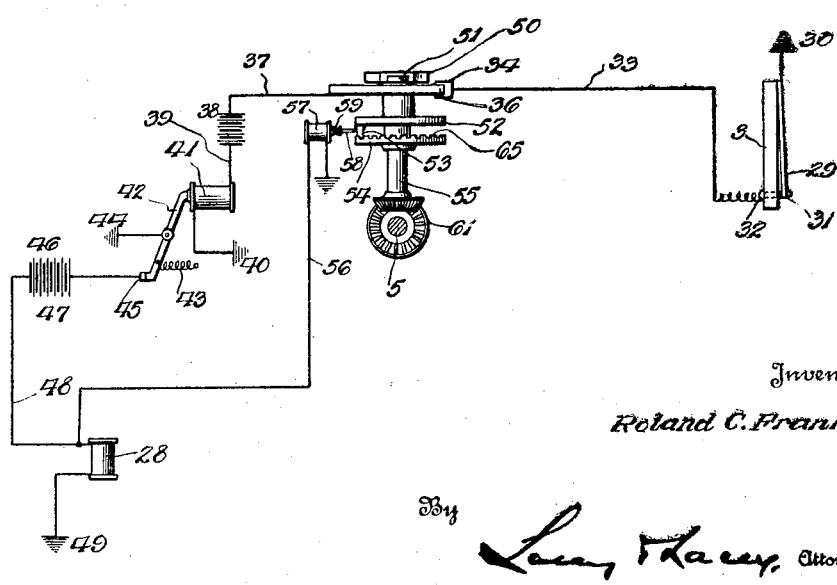
Inventor
Roland C. Franke.
By Lacey & Lacey, Attorneys

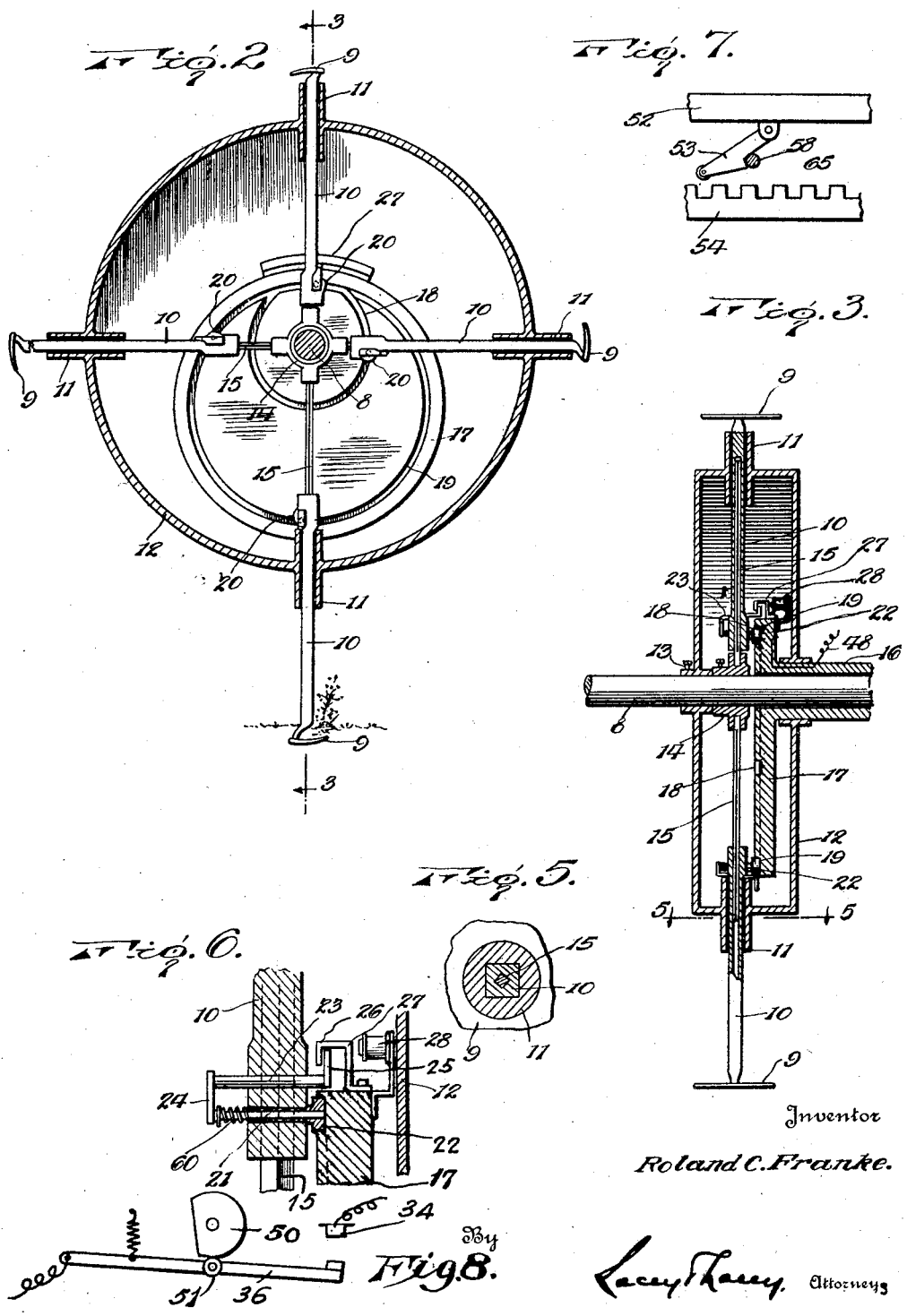

Patented Dec. 16, 1924.

1,519,198

UNITED STATES PATENT OFFICE.

ROLAND C. FRANKE, OF MULLEN, NEBRASKA.

COTTON CHOPPER.

Application filed June 30, 1922, Serial No. 571,864. Renewed May 9, 1924.

*To all whom it may concern:*

Be it known that I, ROLAND C. FRANKE, a citizen of the United States, residing at Mullen, in the county of Hooker and State of Nebraska, have invented certain new and useful Improvements in Cotton Choppers, of which the following is a specification.

My invention relates to cotton choppers and has for its object the provision of automatic means whereby the action of the hoe or chopping blades may be controlled so that the plants will be cut out at the desired regular intervals. The invention seeks to provide mechanism which may be readily mounted upon the chopper frame and operated electrically so that as the machine is drawn along the row of plants the action of the blade will be arrested except when the plants to be cut out are located at the predetermined intervals. The invention is illustrated in the accompanying drawings and will be hereinafter fully set forth.

In the drawings—

Figure 1 is a plan view of a cotton chopper having my improvements embodied therein;

Fig. 2 is an enlarged sectional elevation, showing the mounting of the hoes or chopper blades;

Fig. 3 is a section on line 3—3 of Fig. 2;

Fig. 4 is a diagrammatic view of the controlling mechanism;

Fig. 5 is a detail section on line 5—5 of Fig. 3;

Fig. 6 is an enlarged detail section through the means for shifting the hoe shank;

Fig. 7 is a detail view of a part of the actuating mechanism. Fig. 8 is a detail plan of a portion of the mechanism.

In the drawings, the reference numeral 1 indicates the frame of a cotton chopper which may be of any well-known or preferred construction and is mounted upon ground wheels 2 which are adapted to run upon the ground at opposite sides of the row of plants and also constitute the driving instrumentalities. A front truck, indicated at 3, is also provided and a draft pole or tongue 4 projects from the main frame whereby it may be drawn along the row of plants by a tractor or by draft animals. The ground wheels 2 are arranged to actuate an axle or driving shaft 5 through a well-known escapement mechanism so that the axle will be rotated upon forward movement of the machine but will remain at rest upon backward travel, and differences in the speeds of the driving wheels, when turning corners, will be accommodated. Upon the axle 5 is secured a driving gear 6 meshing with a pinion 7 upon the chopper shaft 8 which, in the illustrated arrangement, is disposed obliquely upon the chopper frame and carries blades or hoes 9 which may be of any desired form.

Each hoe 9 is secured upon the outer end of a shank 10 which is slidably mounted in radial tubular guides 11 provided upon the circumferential wall of a casing 12 which is secured rigidly to the chopper shaft 8, as indicated at 13, so as to rotate with said shaft. A hub 14 is also secured to said shaft within the casing 12, and spokes or radial arms 15 are fixed to said hub and fit slidably within the respective hollow shanks 10, as shown in Figs. 2 and 3. A sleeve 16 extends through one side of the casing 12 and fits loosely about the shaft 8, said sleeve being rigidly secured at its outer end to the main frame and carrying a track plate or disk 17 at its inner end within the casing. The track plate is disposed near and parallel with the plane of the hoe shanks 10 and the spokes 15 and, in its face presented to said shanks and spokes, is constructed with two tracks or grooves 18 and 19, and it will be readily noted, upon reference to Fig. 2, that the track 18 is concentric with the shaft 8 while the track 19 is eccentric to said shaft but merges with or meets the track 18 above the shaft. Each shank 10 is, at its inner end, provided with a lateral enlargement 20 in which is slidably fitted a pin 21 carrying a roller 22 at one end which is adapted to travel in the track 18 or the track 19 as the case may be. Obviously, when the roller travels in the inner track 18, the hoe will be held retracted so that it will not cut through the plants, but if the roller be shifted to travel in the track 19 the hoe will be projected at the lowest point of its travel and a plant will be cut out. Slidably mounted in the shank, radially beyond the pin 21 is a pusher 23 provided at one end with an inwardly projecting lip 24 arranged to bear upon the end of the pin 21, and at its opposite end with an outwardly projecting lip 25 adapted to ride within the overhanging flange 26 of a shifter bar 27 which is slidably supported on the upper edge portion of the track plate or disk and constitutes the armature of an electromagnet 28 which is supported by the said plate.

Upon the front truck 3, I secure a resilient circuit-closing arm or member 29 which has a grounded connection, shown at 30, with the metal parts of the chopper frame and has its terminal 31 normally set off from the truck in advance of the same, as shown in Fig. 4. The terminal 32 of an electric conductor 33 is carried by the truck 3 in position to be engaged by the terminal 31 and the said conductor extends to a contact 34 which will preferably be disposed within a casing or box 35 secured upon the frame 1. The contact 34 is to be engaged by the end of a conductor lever 36 disposed within the box or casing 35 and pivotally supported at its end remote from the said contact terminal 34. A conductor 37 connects the lever 36 with one side of a battery 38 and from the other side of said battery a conductor 39 leads to a grounded connection 40 upon the metal parts of the chopper frame. The intermediate portion of the conductor 39 constitutes the winding of an electromagnet 41 and an armature 42 is mounted within the box 35 in position to be attracted by said magnet, as will be readily understood, the said armature being normally held away from the magnet by a spring 43 arranged in any convenient manner. The armature 42 is pivotally mounted intermediate its ends and its pivotal mounting has a grounded connection 44 with the chopper frame. The end of the armature more remote from the magnet 41 constitutes a contact adapted to engage a mating contact 45 which is connected by a conductor 46 with one side of a battery 47, the other side of said battery being connected by a conductor 48 with a grounded return 49 and the intermediate portion of said conductor 48 forming the winding of the electromagnet 28, the conductor passing through the sleeve 16, as shown clearly in Fig. 3.

Adjacent the lever or rocking arm 36, a cam 50 is arranged within the box 35 to actuate said arm which may be equipped with a roller 51 to reduce the frictional wear between the parts. The cam 50 is connected with a disk 52 upon the under side of which is pivotally mounted a dog or pawl 53. Below the disk 52, a disk 54 is secured upon the shaft 55 and upon the face thereof presented to the disk 52 are teeth 65 to be engaged at times by the dog or pawl 53. In a shunt circuit 56 from the battery 47 is a solenoid 57, the core 58 of which is normally held in the path of the dog 53 by a spring 59. When the circuit is closed and the solenoid thereby energized, the core will be withdrawn from the dog which will thereupon drop into engagement with the teeth 65 and cause the disk 52 and the cam 50 to rotate with the disk 54. When the circuit is broken, the core will spring back into the path of the dog so as to release the same at the end of one complete revolution. The shaft 55, to which the disk 54 is secured, is driven from the main shaft by gearing indicated at 61.

As the machine is drawn forward along the row of plants, the circuit-closing member 29 will be pushed backwardly by its impact with a plant so that the contact points 31 and 32 will be brought together and the circuit will be closed through the conductors 33 and 37 and 39 and the intermediate parts to energize the magnet 41, whereupon the armature 42 will be attracted, the circuit through the battery 47 and the conductor 48 will be closed, and the magnet 28 energized. The shunt circuit 56 is closed simultaneously with the circuit through the magnet 28 so that the cam 50 will be set in motion, as above set forth. When the magnet 28 is energized, the armature or shifter bar 27 will be attracted and will move across the edge of the track plate, acting upon the lip 25 to shift the pusher 23. The lip 24 on the pusher will obviously transfer the movement to the pin 21 so that the roller 22 will be shifted from the track 19 to the track 18 and the hoe will be held retracted to skip the plant which actuated the circuit-closer 29. As the low part of the cam passes beyond the roller 51 or the point of engagement with the arm or lever 36, the said lever will be swung about its pivot so as to be released from the contact 34 and the circuit will be broken. Should the member 29 strike a plant before the machine has traveled the distance desired between plants, the arm 36 would still be held away from the contact 34 so that the circuit would not be closed and, consequently, the magnet 28 would not be energized so that the operation of the hoe would be continued and the plant would be cut out. It will be understood, of course, that the cam 50 will be provided in a variety of sizes so that during one revolution of the cam, the machine will travel the distance desired between the plants. When the circuit is broken, the shifter 27 will be released and the spring 60 will be free to expand and will return the roller 22 to the track 19 when the hoe again reaches the high point of its travel. The front truck 3 is not required to sustain any substantial part of the weight of the machine but is provided primarily to carry the circuit-closer and its wheels should be rather near together so that the circuit-closer will closely follow the irregularities in the surface of the ground. It will thus be seen that I have provided an exceedingly simple mechanism whereby the plants will be cut out only at the desired intervals and the operation of the chopping blades or hoes will be automatically controlled.

Having thus described the invention, what is claimed as new is:

1. The combination of a chopper shaft, choppers carried thereby, means for continuously rotating the shaft, and plant-actuated means for shifting the choppers whereby they may travel in a path concentric with the shaft without operating or in a path eccentric to the shaft to operate.

2. The combination of a chopper shaft, means for continuously rotating the same, choppers carried thereby and normally operative, a normally open electric circuit, plant-actuated means to close the circuit, means controlled by the circuit to shift the choppers to inoperative position, a normally closed switch in said circuit, and means acting on said switch to open the same upon closing of the circuit and hold it open during one revolution of the chopper shaft and maintain the inoperative position of the choppers during said revolution.

3. In a cotton chopper, the combination with chopping blades, of an armature arranged adjacent the path of the blades, means controlled by said armature to shift the blades from an operative to an inoperative position, a magnet controlling said armature, a circuit-closer arranged to be actuated by a plant past which the machine travels and controlling the energization or de-energization of said magnet, and means for preventing energization of said magnet through predetermined intervals.

4. In a cotton chopper, the combination with cropping blades, of an armature arranged adjacent the path of said chopping blades, a magnet controlling said armature, a second magnet, an armature for said second magnet adapted to close the circuit through the first-mentioned magnet upon energization of the second magnet, a circuit-closer electrically connected with the second magnet and arranged to be actuated by impact upon a plant past which the machine is drawn, and an interrupter interposed in the circuit which includes said circuit-closer and the second magnet.

5. In a cotton chopper, the combination of choppers, a plurality of tracks arranged adjacent the plane of the choppers, means on the choppers to engage the tracks, and means to shift the track-engaging means from one to another track.

6. The combination of a chopper-shaft, choppers carried thereby and slidable radially with respect thereto, a plurality of tracks adjacent and in a plane parallel with the plane of the choppers, one of the tracks being concentric to the chopper shaft and another track being eccentric to the shaft, track-engaging means on the choppers, and means for shifting the track-engaging means from one track to another track.

In testimony whereof I affix my signature.

ROLAND C. FRANKE. [L. S.]